J. L. STANDARD.
ATTACHMENT FOR COTTON GINS.
APPLICATION FILED APR. 21, 1911.
1,001,564.
Patented Aug. 22, 1911.
3 SHEETS—SHEET 1.
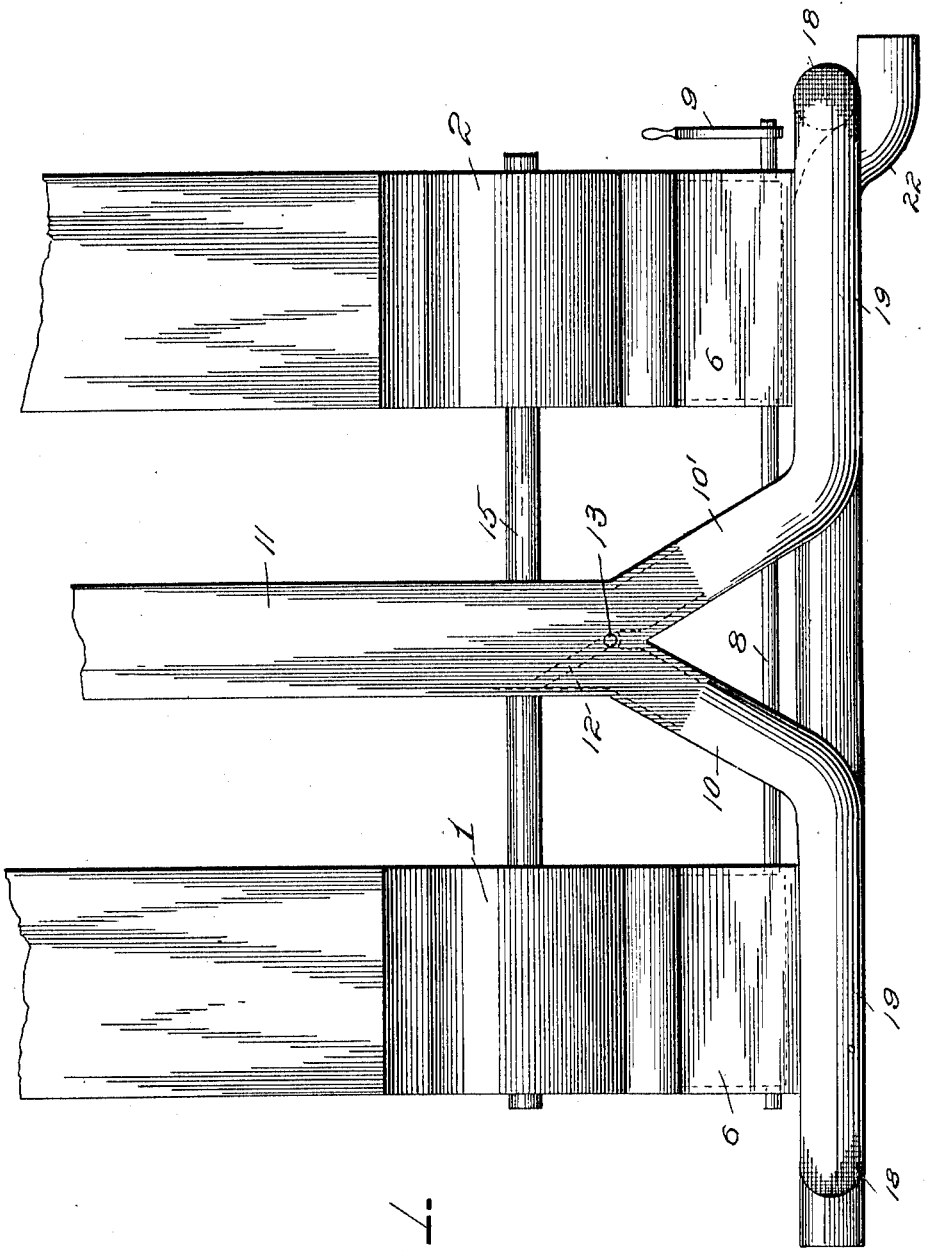
WITNESSES
INVENTOR
James L. Standard
Attorney

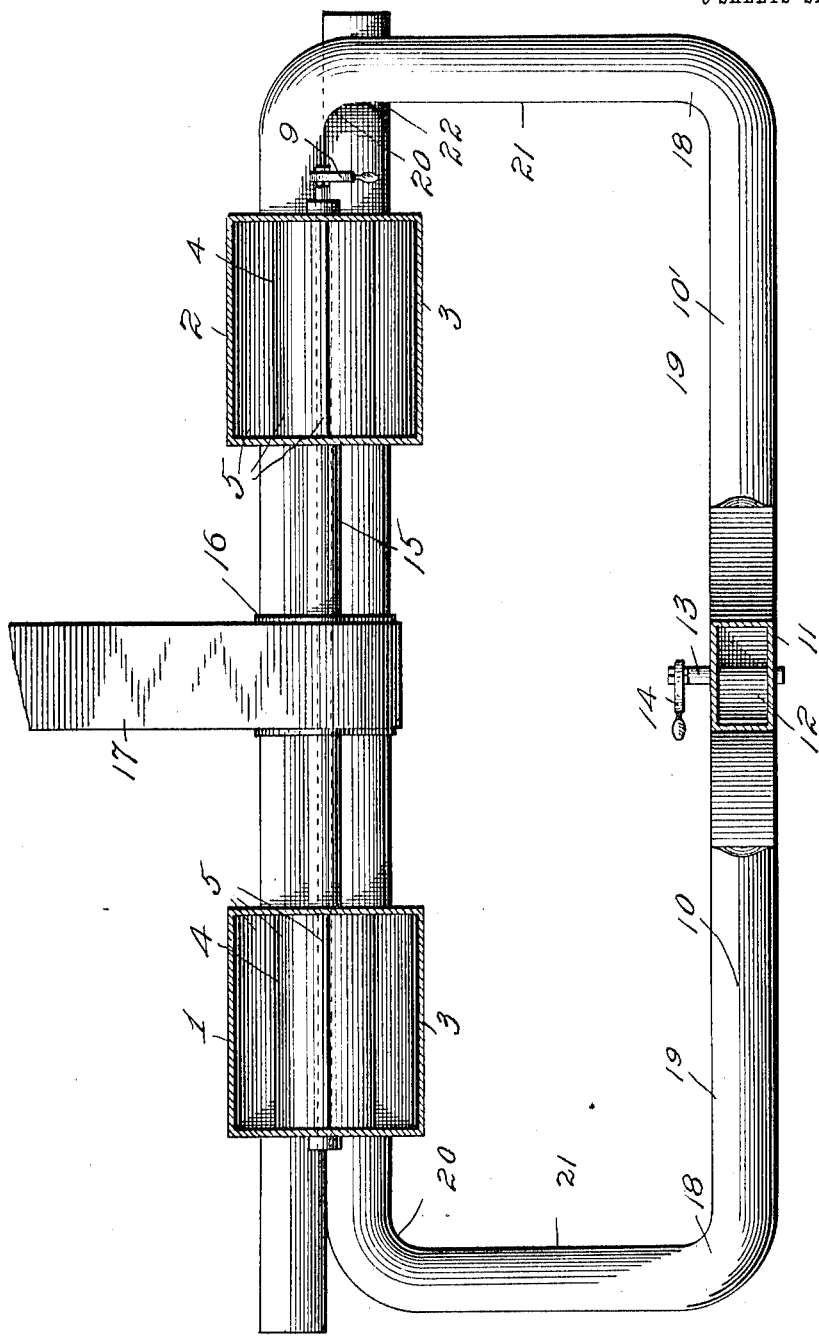

J. L. STANDARD.
ATTACHMENT FOR COTTON GINS.
APPLICATION FILED APR. 21, 1911.
1,001,564.
Patented Aug. 22, 1911.
3 SHEETS—SHEET 3.
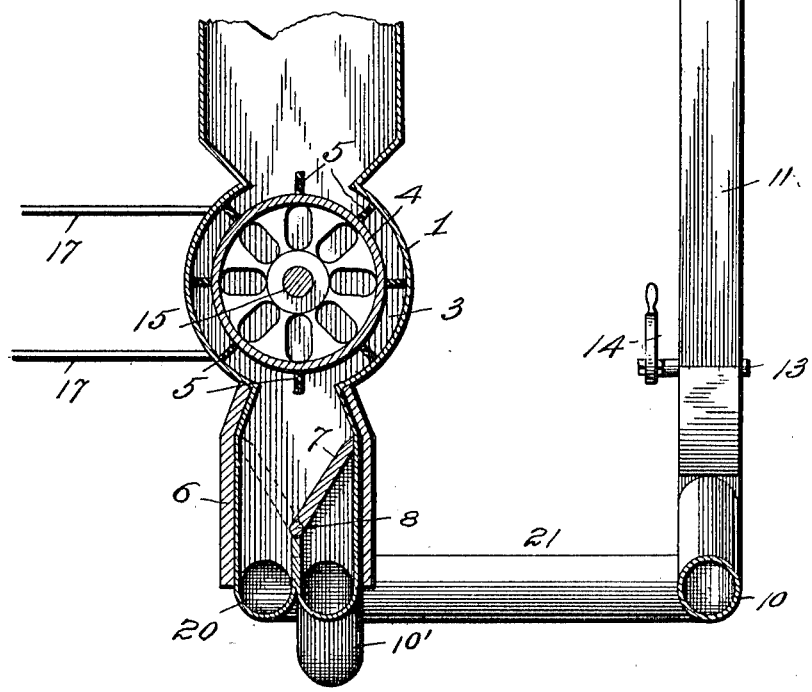
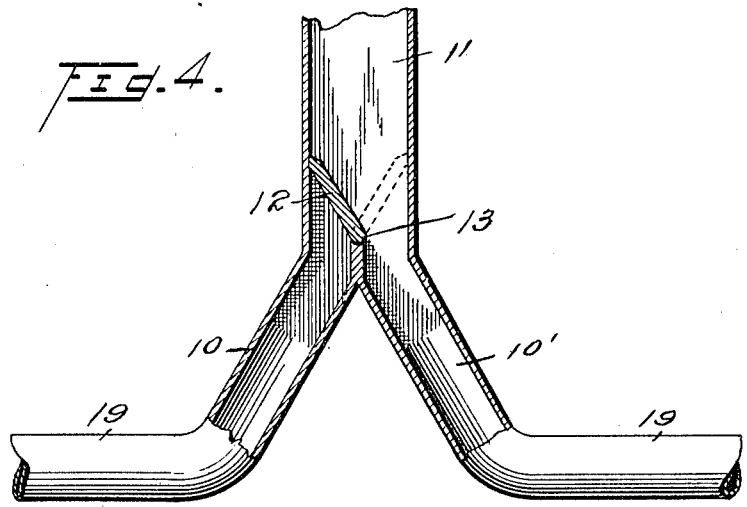
WITNESSES
INVENTOR
James. L. Standard
Attorney

UNITED STATES PATENT OFFICE.

JAMES L. STANDARD, OF HAMBURG, ARKANSAS.

ATTACHMENT FOR COTTON-GINS.

1,001,564.     Specification of Letters Patent.     Patented Aug. 22, 1911.

Application filed April 21, 1911. Serial No. 622,521.

*To all whom it may concern:*

Be it known that I, JAMES L. STANDARD, a citizen of the United States, residing at Hamburg, in the county of Ashley and State of Arkansas, have invented certain new and useful Improvements in Attachments for Cotton-Gins, of which the following is a specification.

My invention has relation to new and useful improvements in a contrivance for removing the cotton seed from the gin stands in the big system gins and at the same time not mix the seed of one bale with that of another as is done at the present time.

My invention provides a seed valve under each gin and a seed box over each valve, which box conveys the seed into the valve. I also provide means so that all of the valves, above mentioned, may be operated by the same lever and a further object of my invention is to provide means so that the seed boxes below each gin may be operated with one belt.

The main object of my invention is to dispense with the present method of conveying the seed after it passes from the seed box into a square box the length of the gin and is conveyed by means of an auger from said box. As there is always seed in the auger box which cannot be gotten out the seed of one bale after passing into said box will mix with the seed of another bale which is ginned and this will go on continuously. But with the use of my invention the auger is dispensed with and two blow pipes are employed, into one or the other of which the seed may be conveyed, the result being that the air blows all of the seed out of the pipe being used thereby preventing any possible mixing of seed of one bale from that of another during the ginning of different grades of cotton.

The purpose in keeping the seed of one bale from mixing with that of another is to satisfy the desire of farmers who raise different grades of cotton and do not desire the seed thereof mixed with the seed of an inferior grade of cotton produced by some other farmer which would deteriorate the value of the next crop produced by such mixed seed.

With the foregoing and other objects in view my invention consists in the novel features of construction, combination and arrangement of parts as are described in this specification, illustrated in the accompanying drawings forming a part thereof, and particularly pointed out in the appended claims.

Reference being had to the drawings: Figure 1 is an elevational view of a pair of seed boxes into which the seed is conveyed from respective gins, together with respective valves arranged below each seed box and the blow pipes into which the seed passes from said valves. Fig. 2 is a plan view of the parts illustrated in Fig. 1, said figure also illustrating the belt for operating the rollers within the seed boxes. Fig. 3 is a vertical, transverse, sectional view of one of the seed boxes, its corresponding valve arranged thereunder and the blow pipes into which the seed passes from said valve. Fig. 4 is a vertical, sectional view illustrating the manner in which the air is shot through one or the other of the blow pipes, as is desired.

Referring more particularly to the drawing, in which like numerals designate like parts throughout, my invention is described as follows: The seed is conveyed from the gins into respective seed boxes 1 and 2, as many gins as is desired being operated, in which case a seed box is provided for each gin. Said seed boxes each consist of a body portion 3 having a roller rotatably mounted therein, which roller is provided with a plurality of radially extending transverse felt or leather strips 5. Directly below each seed box and in communication therewith is a valve 6, which valve is provided with a shudder 7 pivotally mounted therein at its lower edge upon a shaft 8. Said shaft 8 extending through all of the valves employed and each shudder 7 is held in its respective valve pivotally by means of said shaft. A lever 9 is provided at one end of the shaft 8 for the purpose of operating the same. Thus it will be seen that all of the shudders in the series of valves may be shifted simultaneously.

Air passes into the blow pipes 10 and 10′, through a trunk 11 which is provided with a shudder 12 therein immediately above the point of bifurcation of said trunk as it is divided into two separate and distinct blow pipes. By means of the shudder 12 a valve is produced by means of which the air may be directed into either one or the other of said blow pipes 10 or 10′. The shaft upon which the shudder 12 is pivotally held at its lower edge is indicated by the numeral 13 and is provided at its outer end with a lever 14 for the operation thereof. Each of said blow pipes 10 and 10′ passes under each of the valves 6 and communicates therewith. As seed passes through the seed boxes 1 and 2 it is directed by means of the shudders 7 in the valves 6 into one or the other of said blow pipes, said seed being constantly carried out of the blow pipe being employed by means of an air current which is directed thereinto by means of a shudder 12 as heretofore stated.

Referring again to the seed boxes it will be stated that each of the rollers 4 is mounted upon a common shaft 15, which shaft is rotated by means of a pulley 16 upon which travels a belt 17 which is driven by any suitable motor.

The preferred arrangement of the blow pipes 10 and 10′ is that they extend in opposite directions to each other being curved similarly at points 18 at right angles to the sections 19 thereof. They are again curved at 20 at right angles to the sections 21 thereof and are so arranged as to lie side by side in proper position to pass under each of the valves 6 to receive the seed passing therethrough as heretofore explained. The extreme end of the inner blow pipe or blow pipe 10 is curved downwardly and outwardly at a point 22 so as not to interfere with the section 21 of the pipe 10′. This is clearly seen in Fig. 1.

Although I have specifically described the novel features of construction, combination and arrangement of the several parts of my invention yet I do not confine myself to such construction, combination and arrangement but reserve and may exercise the right to make such changes therein as do not depart from the spirit of my invention or the scope of the appended claims.

Having described my invention, what I claim as new and desire to secure by Letters Patent, is:

1. In a device of the kind described the combination with a plurality of seed boxes of a plurality of valves one of each arranged immediately below a respective seed box, and a pair of blow pipes adjacent each other arranged below each of said valves and in communication therewith, said valves adapted to direct the seed into one or the other of said blow pipes and means to direct a current of air into one or the other of said blow pipes, substantially as shown and described.

2. In a device of the kind described comprising a plurality of seed boxes arranged above a corresponding plurality of valves, a plurality of blow pipes communicating with a trunk from which an air current is directed into one or the other thereof by means of a valve arranged at the point of bifurcation of said trunk, said blow pipes extending in opposite directions to each other, then at right angles to themselves forming sections which are again turned inwardly at right angles to themselves so that said blow pipes overlap and contact each other and pass directly under each of said plurality of valves and communicate therewith, said valve adapted to cause the seed from the seed boxes to pass into one or the other of said blow pipes and means to cause a current of air to pass through one or the other of said blow pipes.

In testimony whereof I affix my signature in presence of two witnesses.

JAMES L. STANDARD.

Witnesses:
R. R. RADFORD,
J. H. PRYOR.

Copies of this patent may be obtained for five cents each, by addressing the "Commissioner of Patents Washington, D. C."